US011838562B1

(12) United States Patent
Eatedali

(10) Patent No.: US 11,838,562 B1
(45) Date of Patent: Dec. 5, 2023

(54) ACTIVITY-BASED STREAMING VIDEO REPLACEMENT

(71) Applicant: Twitch Interactive, Inc., San Francisco, CA (US)

(72) Inventor: Josiah Eatedali, Palos Verdes, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 306 days.

(21) Appl. No.: 16/833,890

(22) Filed: Mar. 30, 2020

(51) Int. Cl.
*A63F 13/355* (2014.01)
*H04N 21/2187* (2011.01)
*H04N 21/234* (2011.01)

(52) U.S. Cl.
CPC ..... *H04N 21/23424* (2013.01); *A63F 13/355* (2014.09); *H04N 21/2187* (2013.01); *H04N 21/23418* (2013.01)

(58) Field of Classification Search
CPC ......... H04N 21/23424; H04N 21/2187; H04N 21/23418; A63F 13/355
USPC ........................................................ 725/32
See application file for complete search history.

(56) References Cited

U.S. PATENT DOCUMENTS

| | | | | |
|---|---|---|---|---|
| 9,706,136 B2 * | 7/2017 | Lee | ........................ | H04N 7/147 |
| 2007/0162951 A1 * | 7/2007 | Rashkovskiy | ..... | H04N 21/8166 348/E7.071 |
| 2010/0238262 A1 * | 9/2010 | Kurtz | ..................... | H04N 7/142 348/14.01 |
| 2014/0235969 A1 * | 8/2014 | Van Der Heide | .... | A61B 5/4088 600/407 |
| 2016/0012665 A1 * | 1/2016 | Mueller | ................ | G07F 17/323 463/31 |
| 2017/0296933 A1 * | 10/2017 | Ramachandran | ....... | A63F 13/12 |
| 2018/0218400 A1 * | 8/2018 | Kerns | ................ | G06Q 30/0256 |
| 2019/0111347 A1 * | 4/2019 | Rimon | ................ | A63F 13/355 |
| 2021/0129017 A1 * | 5/2021 | White | .................. | A63F 13/426 |
| 2021/0291058 A1 * | 9/2021 | Dura | ....................... | A63F 13/86 |
| 2022/0005156 A1 * | 1/2022 | Otterness | ............... | G06V 20/46 |

FOREIGN PATENT DOCUMENTS

WO    WO2018125559    *   7/2018    ........... H04N 21/845

* cited by examiner

*Primary Examiner* — Nathan J Flynn
*Assistant Examiner* — Caroline Somera
(74) *Attorney, Agent, or Firm* — BakerHostetler

(57) ABSTRACT

An input video stream may include primary video content, such as output from a first video game. An indication of a decrease in player activity in the first video game may be detected. A determination may be made, based at least in part on the indication of the decrease in player activity, to replace a portion of the primary video content with secondary video content. The decrease in player activity in the first video game may coincide with an increase in player activity in a second video game. An indication of this increase in player activity may be detected. The second video game may be selected, based at least in part on the indication of the increase in player activity, to provide the secondary video content. An output video stream is provided in which the selected portion of the primary video content is replaced by the secondary video content.

15 Claims, 8 Drawing Sheets

ACTIVITY-BASED STREAMING VIDEO REPLACEMENT

CROSS-REFERENCE TO RELATED APPLICATIONS

This application is related to the following application, which is hereby incorporated by reference in its entirety: U.S. patent application Ser. No. 16/834,060 filed Mar. 30, 2020, entitled "ACTIVITY-BASED SELECTION OF REPLACEMENT CONTENT".

BACKGROUND

The popularity of video streaming has increased rapidly in recent years. In some cases, the video may be streamed using live streaming techniques, in which video of a live event (e.g., a video game) is captured, transmitted and played to viewers while the live event is still occurring, with only small amounts of latency between the time that the video is captured and played to the viewers. In some examples, a video stream may include primary video content (e.g., video from a particular video game) that is displayed to viewers for a majority of the time that the video stream is transmitted. In some cases, however, it may advantageous to replace one or more portions the primary video content with other video content, referred to herein as secondary video content.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
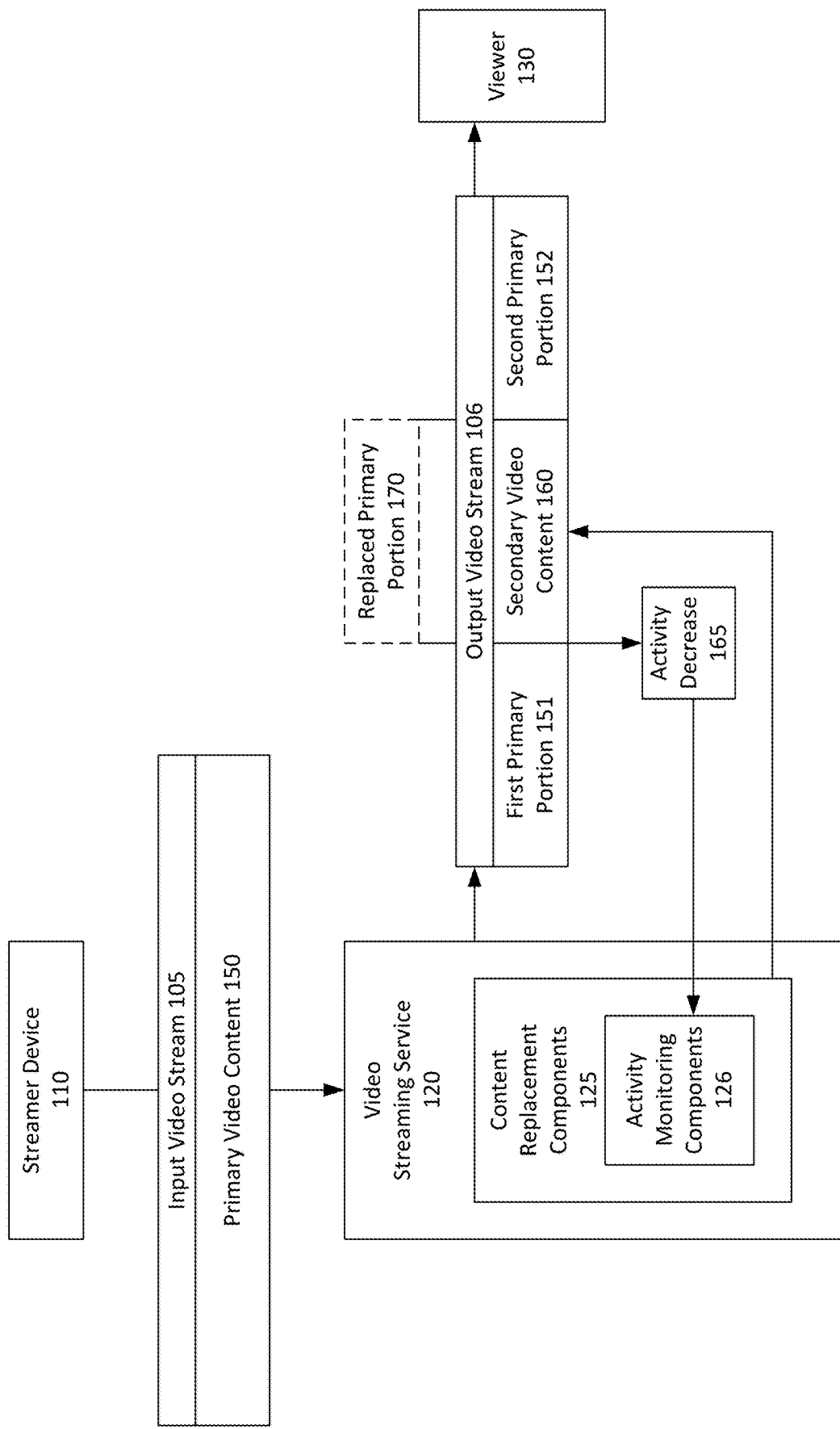
FIG. 1 is a diagram illustrating an example activity-based streaming video replacement system that may be used in accordance with the present disclosure.

Techniques for activity-based streaming video replacement are described herein. In some examples, a video stream including primary video content may be transmitted from a video streaming service to one or more viewers over one or more communications networks. In some examples, a streamer may capture the primary video content and transmit the primary video content to a video streaming service. The video streaming service may then, in turn, transmit the primary video content to the viewers for display. In one specific example, a streamer may be a video game player, and the primary video content may include video of the streamer playing a video game, such as the rendered graphical video output from the video game. Additionally, in some examples, the primary video content may also include other related video content, such as video from a webcam that shows video of the streamer's face, often in combination with audio content of the streamer verbally discussing or commenting on the gameplay. In some examples, the primary video content may be transmitted to viewers and played using live streaming techniques. For example, video content of a live event (e.g., video game) may be transmitted to viewers, and at least part of the video content may be played while the live event is still occurring (e.g., while the video game is still being played by the streamer), albeit with some small amounts latency between the time that video content is captured by the streamer and the time that the video is eventually played to viewers.

In some examples, it may be desirable to replace one or more portions of the primary video content in the video stream with other video content, referred to herein as secondary video content. Some examples of secondary video content may include other streaming video content (e.g., from other video games that are being played simultaneously with the streamer's video game), advertising or informational content, and/or other types of video content. However, one problem related to replacement of primary video content is that, if the portions that are replaced are selected at random, then there may be scenarios in which the replaced portions include portions of higher interest to viewers, such as intense or key moments in battles or matches of the video game. This may be frustrating to viewers, because the viewers may have to invest time and sit through periods of lower interest, while not being able to view and experience the more interesting portions of the primary video content. One existing solution to this problem is to allow the streamer to manually select portions of the primary video content for replacement. However, this requires a manual input from the streamer which may be cumbersome and distracting to the streamer. For example, if the streamer is playing a video game, the streamer may not want to interfere with his gameplay in order to manually select and request certain portions of the primary content for replacement.

The techniques described herein may allow the video streaming service to intelligently select one or more portions of the primary video content to replace with secondary video content, such as by determining portions of the primary video content that are likely to be of lower interest to viewers and replacing those lower interest portions with secondary content (as opposed to replacing the higher interest portions of the primary video content). Specifically, in some examples, these techniques may include detecting an indication of a temporary decrease in player activity associated with the video game, which may be likely to correlate to a portion of lower interest to viewers. Some example indications of a temporary decrease in player activity may include at least one of a loading stage, a respawn event, an end of a match or battle, a character death, a player leaving the video game, or a decrease in player movement.

The indication of the temporary decrease in player activity may be detected by performing an automated software-based image analysis on the primary video content to identify a visual cue that is indicative of the temporary decrease in player activity. In some examples, the visual cue may include text within the primary video content. For example, one or more frames of the primary video content may include text such as "loading" to indicate a downtime event. In other examples, a text field that shows a number of active players or a list of player names may be analyzed to detect when a player joins or leaves the game or when a character is killed. In yet other examples, a clock or timer that shows time remaining in a match or battle may be detected and read to determine when the match or battle ends. Also, in some examples, the visual cue may include graphics within the primary video content. For example, one or more frames of the primary video content may include graphics indicative of a downtime event, such as a death animation, crossing a finish line, characters running off a field, and the like. In yet other examples, the indication of the downtime event may include a metadata tag or watermark that is inserted into one or more images of the primary video content. In yet other examples, webcam video of a streamer commenting on a game that he is playing may be analyzed for downtime detection. For example, if the streamer leaves a room or otherwise leaves the webcam's field of the view for at least a threshold time period, then this may be indicative of a downtime event. Furthermore, in some examples, the video streaming service may receive video game state data (e.g., game metadata) from the video game itself. For example, in some cases, the state data may include descriptions of specific event types, such as a loading stage, a respawn event, an end of a match or battle, a character death, a player leaving the video game, or a decrease in player movement. In some examples, the state data may be less specific, and may simply indicate that a downtime event or period of low activity is occurring, without identifying a specific type of downtime event. Also, in some examples, the state data may include game statistical information, such as amounts and/or frequencies of player movement over one or more time periods, player scores, standings, inventories, locations, health, timing information, and the like.

In some examples, in order to determine when the downtime event is completed, the system may monitor the video game to determine an indication of an increase in player activity. This increase in player activity may serve as a trigger to switch back to the primary content, either immediately or after some delay (e.g., the system may allow a current advertisement finish before switching back to the primary content—but may not show any additional advertisements). Also, in some examples, a predicted duration of the decrease in player activity may be estimated. This predicted duration may then be used to select a duration of the primary video content that is to be replaced with secondary content. In some examples, the predicted duration may be estimated based on a type of event to which the decrease in player activity corresponds. For example, in some cases, the system may estimate that a loading stage may last two minutes, while a respawn event may be estimated to last for sixty seconds. Also, in some cases, the predicted durations may differ based on different video game titles or levels. For example, a loading stage for a first game title may be estimated to take two minutes, while a loading stage for a second game title may be estimated to take three minutes.

In one specific example, the primary video content may include video from a first video game, and the secondary content that replaces the selected portion of the primary video content may include video from a different video game (i.e., second video game). Additionally, in some examples, the secondary video content that replaces the primary video content may be selected based on an increase in activity (e.g., an activity spike) in the second video game. The increase in activity in the second video game may serve as an indication that the second video game may be experiencing intense or key moments that may likely be of high interest to viewers. For example, in some cases, a downtime event in the first video game (i.e., primary video content) may coincide with a detected spike in activity in a second video game. Based on this activity spike, video from the second video game may be selected as the secondary video content that is used to replace the primary video content during the downtime event in the first video game. In some examples, this may allow viewers to experience intense or key moments from the second video game during the downtime event in the first video game. In some examples, the video streaming service may monitor activity levels in the second video game, such as by using any or all of the activity detection techniques described above (e.g., video game state data, image data analysis, etc.). The video game streaming service may then detect an indication of a temporary increase in player activity associated with the second video game. In some examples, the indication of the increase in player activity may correspond to events such as an increase in player movement, a player joining the second video game, a start of a match or battle in the second video game, an end of a loading stage in the second video game, or other events. The video streaming service may then determine, based on the indication of the increase in player activity in the second video game, to replace the primary video content with secondary video content from the second video game FIG. 1 is a diagram illustrating an example activity-based streaming video replacement system that may be used in accordance with the present disclosure. As shown, an input video stream 105 including primary video content 150 is transmitted from a streamer device 110 to a video streaming service 120. Additionally, an output video stream 106 is transmitted from the video streaming service to viewer 130. As will be described in detail below, the output video stream includes portions of the primary video content 150, including first primary portion 151 and second primary portion 152. The input video stream 105 and the output video stream 106 may be transmitted over one or more communications networks, for example one or more local area networks (LANs) or one or more wide area networks (WANs), such as the Internet. A video stream is video that is transmitted using streaming transmission techniques, in which portions of video content may be played and displayed to a viewer while subsequent portions of the video content are still being transmitted. The streamer device 110 is a computing device operated by a streamer, which is a person that provides video content for viewing by one or more viewers. In one specific example, a streamer may be a video game player, and the primary video content 150 may include video of the streamer playing a video game, such as the rendered graphical video output from the video game. Additionally, in some examples, the primary video content 150 may also include other related video content, such as video from a webcam that shows video of the streamer's face, often in combination with audio content of the streamer verbally discussing or commenting on the gameplay. In some examples, the primary video content 150 may be transmitted to viewer 130 and played using live streaming techniques. For example, video content of a live event (e.g., video game) may be transmitted to viewer 130, and at least part of the video content may be played while the live event is still occurring (e.g., while the video game is still being played by the streamer), albeit with some small amounts latency between the time that video content is captured by the streamer and the time that the video is eventually played to viewer 130.

In the example of FIG. 1, the video streaming service 120 selects replaced primary portion 170, which is a portion of the primary video content 150 that is selected for replacement in the output video stream 106. The replaced primary portion 170 is replaced with other video content, referred to herein as secondary video content 160. Some examples of secondary video content 160 may include other streaming video content (e.g., from other video games that are being played simultaneously with the streamer's video game), advertising or informational content, and/or other types of video content.

The techniques described herein may allow the video streaming service 120 to intelligently select the replaced primary portion 170, such as by determining a portion of the primary video content 150 that is likely to be of lower interest to viewer 130 and replacing this lower interest portion with the secondary video content 160. Specifically, in some examples, these techniques may include detecting an indication of an activity decrease 165, such as a temporary decrease in player activity associated with the video game, which may be likely to correlate to a portion of lower interest to viewer 130. Some example indications of the activity decrease 165 may include at least one of a loading stage, a respawn event, an end of a match or battle, a character death, a player leaving the video game, or a decrease in player movement.

In the example of FIG. 1, the video streaming service 120 includes content replacement components 125, which may select portions of primary video content for replacement and may also select the secondary video content that is used for replacement. The content replacement components 125 may include activity monitoring components 126, which may monitor the primary video content 150 (and optionally other video content) to detect changes (e.g., decreases and/or increases) in activity, such as player activity within a video game. Specifically, in the example of FIG. 1, the activity monitoring components 126 may monitor the primary video content 150 to detect activity decrease 165.

Figure 2:
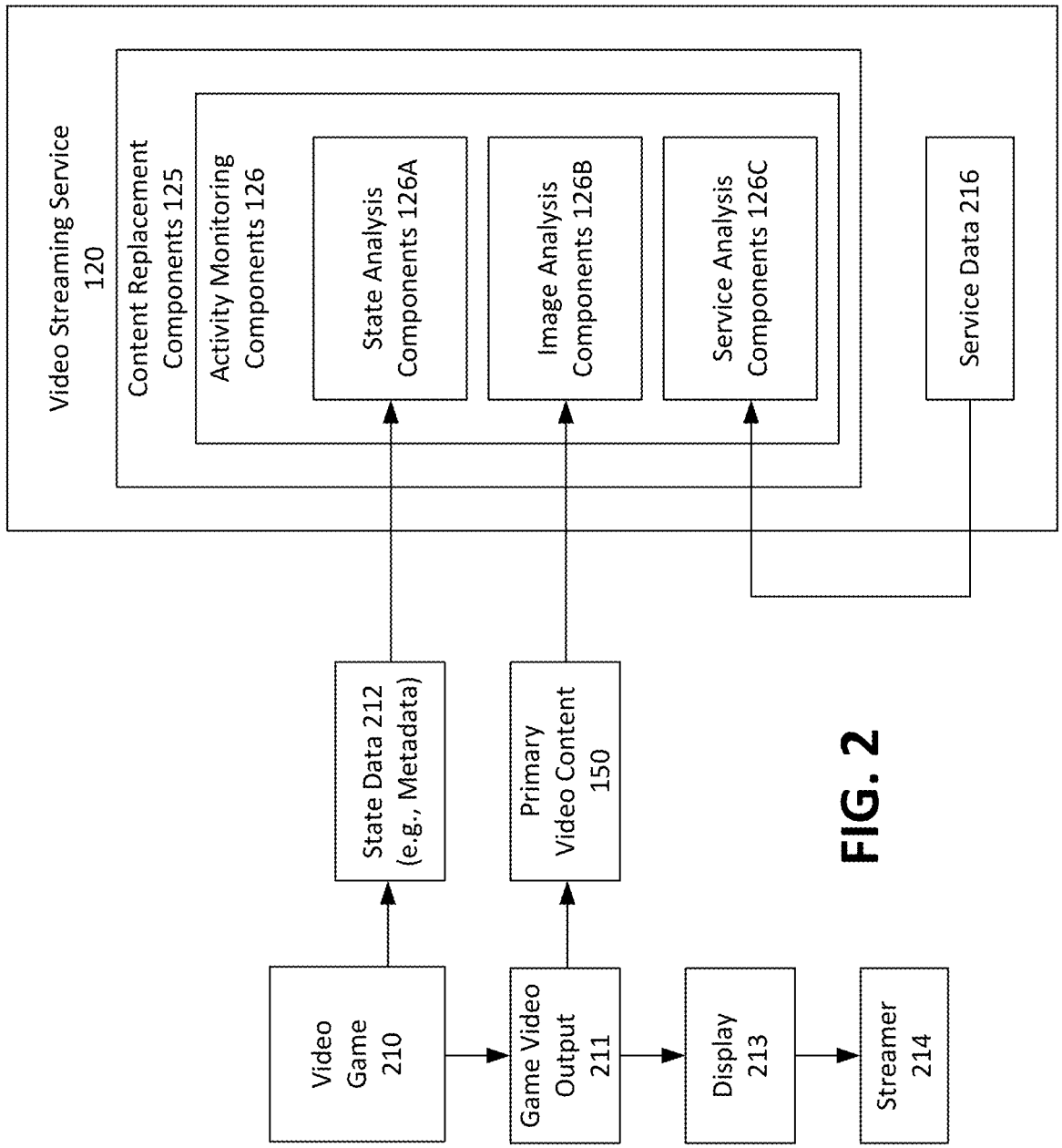
FIG. 2 is diagram illustrating an example activity monitoring system that may be used in accordance with the present disclosure.

Referring now to FIG. 2, some example activity detection techniques will now be described in detail. Specifically, in the example of FIG. 2, the primary video content 150 includes game video output 211 from a video game 210, such as the rendered graphical video output from the video game 210. For example, the streamer 214 may be playing the video game 210, such as by controlling one or more characters or other objects within the video game 210. The game video output 211 may be displayed to the streamer 214 via a display 213 of a computing device operated by the streamer 214 (e.g., streamer device 110 of FIG. 1). The primary video content 150 may include video that is captured from the game video output 211, such as via screen capture components operated by the streamer 214.

As shown in FIG. 2, the activity monitoring components 126 may include state analysis components 126A. In this example, the video game 210 provides state data 212, such as game metadata, to the state analysis components 126A. The state analysis components 126A may generally use the state data 212 to determine increases and/or decreases in player activity levels corresponding to primary video content 150. For example, in some cases, the state data 212 may include identifications and/or indications of specific event types, such as a loading stage, a respawn event, an end of a match or battle, a character death, a player leaving the video game, or a decrease in player movement. In some examples, the state data 212 may be less specific, and may simply indicate that a downtime event or period of low activity is occurring, without identifying a specific type of downtime event. Also, in some examples, the state data 212 may include game statistical information, such as amounts and/or frequencies of player movement over one or more time periods, player scores, standings, inventories, locations, health, timing information, and the like. Also, in some examples, the state data 212 may identify or indicate an expected time duration of a downtime event. In one specific example, the video streaming service 120 (including the state analysis components 126A) may obtain the state data 212 by forming a direct connection to a game server application programming interface (API). Also, in some examples, the video game 210 may publish a listing or other indication of different types of state data 212 (e.g., player movement data, battle start and end data, etc.), and the video streaming service 120 may subscribe (or otherwise select) to receive notifications of certain types of state data 212 that are of interest to the video streaming service. The video streaming service 120 may then only receive updates for the types of state data that it has selected (as opposed to all state data 212). The types and specificity of the state data 212 may vary as desired. For example, for player movement, the state data 212 may, in some cases, be continually and/or periodically updated to show different amounts and/or frequencies of player movement over a different time periods, such as a moving average time window. In other examples, the video streaming service 120 may wish to be notified only when player movement has increased and/or decreased by at least a particular percentage or amount—or has fallen below or risen above a particular threshold amount. In yet other examples, the video streaming service 120 may wish to be notified only that an increase or decrease in activity has occurred, without necessarily being notified that the increase or decrease specifically relates to player movement.

As also shown in FIG. 2, the activity monitoring components 126 may include image analysis components 126B. The image analysis components 126B may generally analyze the primary and/or secondary video content to determine increases and/or decreases in player activity levels corresponding to primary video content 150. For example, the image analysis components 126B may detect the activity decrease 165 by performing an automated software-based image analysis on the primary video content 150 to identify a visual cue that is indicative of the activity decrease 165. In some examples, the visual cue may include text within the primary video content 150. For example, one or more frames of the primary video content 150 may include text such as "loading" to indicate a downtime event. In other examples, a text field that shows a number of active players or a list of player names may be analyzed to detect when a player joins or leaves the game or when a character is killed. In yet other examples, a clock or timer that shows time remaining in a match or battle may be detected and read to determine when the match or battle ends. Also, in some examples, the visual cue may include graphics within the primary video content 150. For example, one or more frames of the primary video content may include graphics indicative of a downtime event, such as a death animation, crossing a finish line, characters running off a field, and the like. In yet other examples, the indication of the downtime event may include a metadata tag or watermark that is inserted into one or more images of the primary video content 150.

Furthermore, in the example of FIG. 2, the activity monitoring components 126 include service analysis components 126C. The service analysis components 126C may generally analyze service data 216 related to the primary video content 150. This service data 216 may include data provided by various computing services, such as chat and other communications services, information about how many viewers a streamer has at a particular time, and information about votes and wagers associated with a particular game. For example, in some cases, to indicate a decrease in activity, the service data 126 may indicate a decrease in text messages being sent that are related to an application (e.g. video game) that is shown in the primary video content 150, a decrease in votes or wagers associated with an application that is shown in the primary video content 150, and/or decrease in viewers of streams that include an application that is shown in the primary video content 150. In some examples, the services from which service data 126 is obtained may include services hosted by the video streaming service 120—though in some examples data from services hosted by third-parties may also be obtained.

Figure 3:
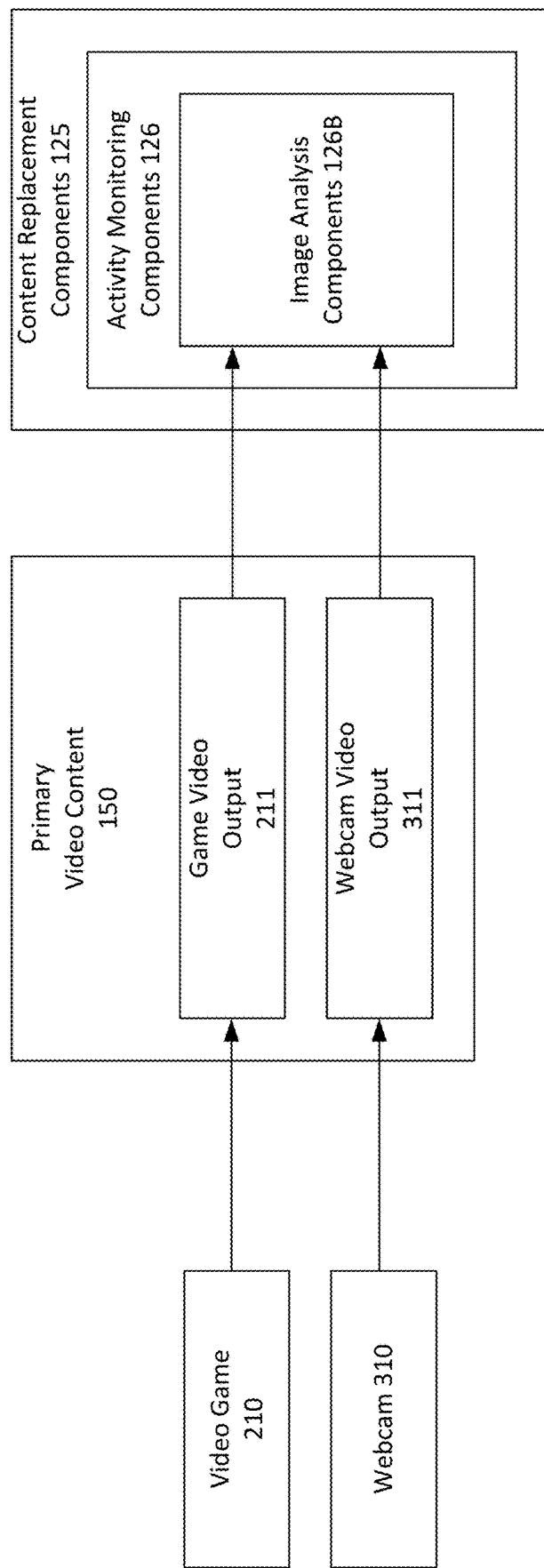
FIG. 3 is a diagram illustrating an example image analysis system that may be used in accordance with the present disclosure.

As described above, in some examples, in addition to game video output 211 from video game 210, the primary video content may also include webcam video of the streamer 214 (e.g. the streamer's face) discussing or commenting on the video game 210. Referring now to FIG. 3, an example is shown in which the primary video content 150 includes both game video output 211 and webcam video 311. The webcam video 311 may be generated by a webcam 310 that captures video of the streamer 214 as described above. In the example of FIG. 3, the image analysis components 126B of activity monitoring components 126 may, in addition or as an alternative to the game video output 211, also analyze the webcam video 311 to determine changes in player activity of the video game 210. For example, if the streamer leaves a room or otherwise leaves the webcam's field of the view for at least a threshold time period, then this may be indicative of a downtime event. As another example, if the streamer returns to a room or otherwise returns to the webcam's field of the view, then this may indicate that the downtime event has ended (or is about to end).

In some examples, in order to determine when the downtime event is completed, the video streaming service 120 may monitor the primary video content 150 to determine an indication of an increase in player activity. This increase in player activity may serve as a trigger to switch back to the primary content, either immediately or after some delay (e.g., the system may allow a current advertisement finish before switching back to the primary content—but may not show any additional advertisements). Some example techniques for detecting an indication of an increase in player activity are described in detail below. Also, in some examples, a predicted duration of the decrease in player activity may be estimated. This predicted duration may then be used to select a duration of the replaced primary portion 170 that is to be replaced with secondary content and/or to select the duration of the secondary content that replaces the replaced primary portion 170. For example, in some cases, if it is predicted that the decrease in player activity will last for two minutes, then a secondary content item having a duration of two minutes may be selected to replace the primary content, for example as opposed to other secondary content items that are three minutes long or ninety seconds long. In other examples, instead of using a single secondary content item that is two minutes long, two secondary content items that are each one minute long may be used (for a total of two minutes). In some examples, the predicted duration may be estimated based on a type of event to which the decrease in player activity corresponds. For example, in some cases, the video streaming service 120 may estimate that a loading stage may last two minutes, while a respawn event may be estimated to last for sixty seconds. Also, in some cases, the predicted durations may differ based on different video game titles or levels. For example, a loading stage for a first game title may be estimated to take two minutes, while a loading stage for a second game title may be estimated to take three minutes.

In some cases, the video streaming service 120 may observe and monitor execution of different video games, game titles, levels, etc. to gather data regarding durations of different downtime events, such as average or moving average durations, and use this data to estimate the predicted downtime durations for different events. Moreover, in some examples, the video streaming service 120 may use this data to create secondary content that will match the estimated durations of the downtime events. For example, if it is known that a frequently occurring downtime event (e.g., loading stage) is estimated to last for forty-five seconds, then the video streaming service 120 may advise or/and request that secondary content be created to have a duration of forty-five seconds. In yet other examples, different groups of secondary content of different durations may be created, and the secondary content that is chosen to replace a downtime event may be selected from a particular group whose duration matches the estimated length of the downtime event. For example, a group of secondary content items each having a duration of two minutes may be formed. Then, if a downtime event is estimated to last for two minutes, the video streaming service 120 may select one of the secondary content items from that group in order to replace and fill the downtime event. Additionally, the system may monitor the number of viewers that leave during replacement of particular downtime events, such as to adjust or improve the estimations and data. For example, if a large number of viewers are leaving during replacement of a particular downtime event, then the system may determine that the estimation of the duration of downtime event should be shortened—or perhaps that the downtime event should not be replaced at all.

In some examples, the video streaming service 120 may coordinate replacement of primary video content across multiple different video streams, such as multiple streams from different players in the same game. For example, in some cases, if the video streaming service 120 detects an indication of decreased player activity in a video stream from a first video game player, the video streaming service 120 may then replace primary video content in the first player's video stream as well as other video streams from other players of the same video game as the first player. The replacement of primary content across the different video streams may be coordinated, such that the replacement of the video content may begin and end at the same or similar times. This may be advantageous because there may be a high probability that other players in the same video game as the first player are experiencing the same downtime event as the first player. For example, if the video game is undergoing a loading stage, then it may be likely that all game players may be impacted by the loading stage. Additionally, in some examples, activity data across multiple different players from the same game may be compared and aggregated, such as to determine more intelligent and/or precise indications of downtime events. For example, if activity data indicates that streams from all players (or most players) in a particular game are experiencing a downtime event, then this may be a stronger indication of a downtime event then if activity data is received for only a single player's stream is received. In one specific example, video content may be replaced for all streams from a particular game when activity data for a minimum threshold amount or percentage of streams from that game is indicative of a downtime event. In yet other examples, the video streaming service 120 (or another entity) may request that a video game server generate a downtime event at a particular requested time (e.g., 8:00 PM) and/or with a particular requested time duration (e.g., two minutes) that is selected by the video streaming service. The video streaming service 120 would then be able to replace primary video content from all streams that are captured from that game at the requested time and/or for the requested time duration. For example, if the video streaming service 120 had a two-minute advertisement or other secondary content item that the video streaming service wished to show to viewers, then the video streaming service 120 could request that a game server generate a two-minute downtime event to allow the two-minute advertisement to be shown to viewers. In some examples, this may be particularly advantageous in e-sports contexts, in which downtime events such as halftimes, timeouts, and other breaks may be easily integrated into the context of video games.

Referring back to FIG. 1, it is seen that replaced primary portion 170 is selected to be replaced by the secondary video content 160. In some examples, the replaced primary portion 170 may include one or more complete frames of the primary video content 150, meaning that one or more complete frames of the primary video content 150 are replaced with the secondary video content 160. However, in other examples, the replaced primary portion 170 may include only portions of one or more frames (i.e., less than complete frames), meaning that only portions of one or more frames of the primary video content 150 are replaced with the secondary video content 160. Specifically, in some cases, the secondary video content 160 may be inserted into the output video stream 106 such that the secondary video content 160 obstructs only part of a frame of the primary video content 150. In one specific example, the secondary video content 160 may obstruct an area in the lower-right-corner of the frame, such that the remainder of the frame is still displayed in the output video stream 106.

Figure 4:
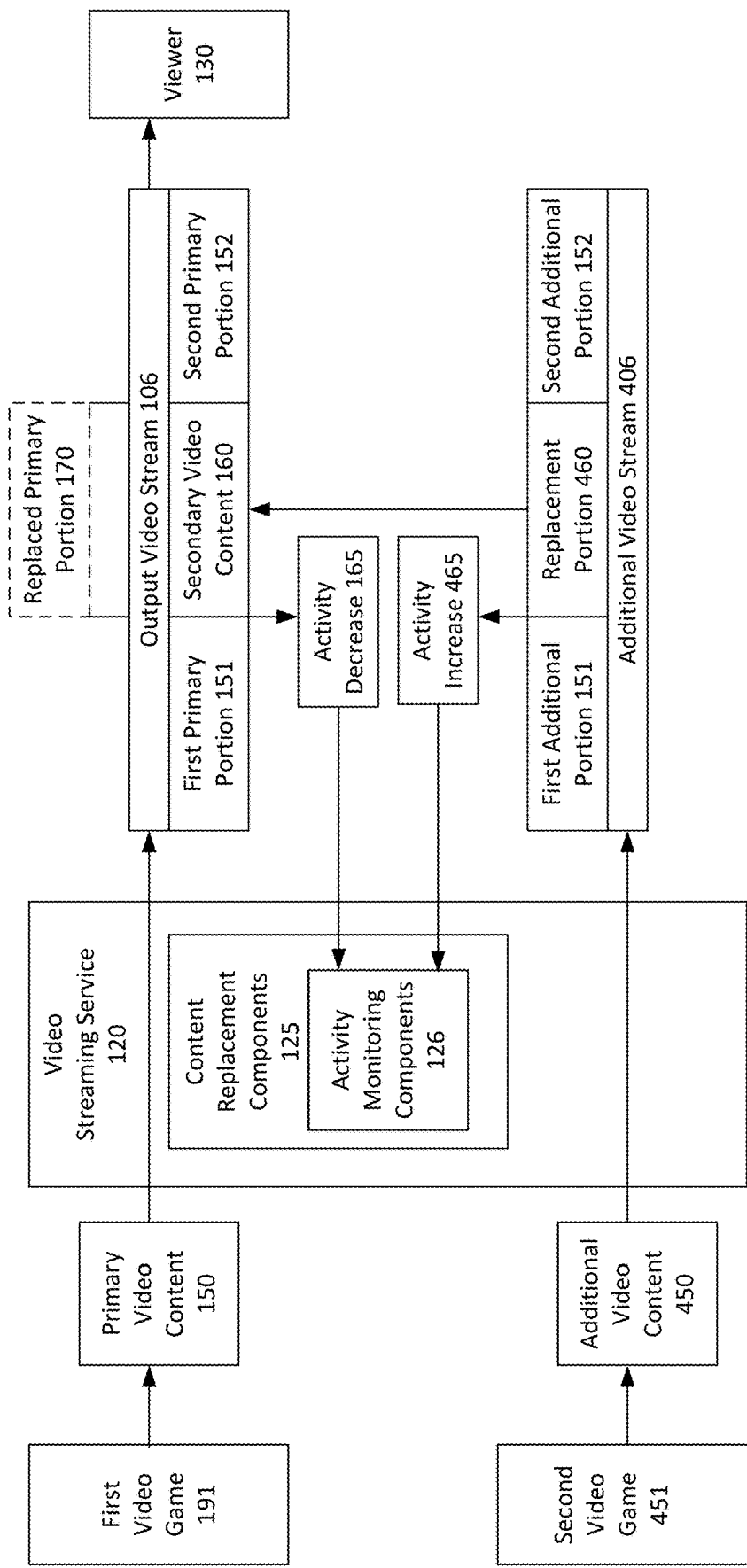
FIG. 4 is a diagram illustrating an example activity-based replacement video selection system that may be used in accordance with the present disclosure.

In one specific example, the primary video content 150 may include video from a first video game, and the secondary content that replaces the selected portion of the primary video content may include video from a different video game (i.e., second video game). Additionally, in some examples, the secondary video content that replaces the primary video content may be selected based on an increase in activity (e.g., an activity spike) in the second video game. In particular, referring now to FIG. 4, an example is shown in which video streaming service 120 provides an output video stream 106 that includes primary video content 150 corresponding to (e.g., captured from) a first video game 191. Also, in the example of FIG. 4, the video streaming service 120 provides an additional video stream 406 that includes additional video content 450 corresponding to (e.g., captured from) a second video game. As shown, the activity monitoring components 126 of video streaming service 120 detect an indication of an activity decrease 165 associated with the first video game 191. At (or around) the same time, an indication of an activity increase 465 associated with the second video game 451 is detected. In this example, based on the detection of indication of the activity increase 465, a portion (i.e., replacement portion 460) of the additional video stream 406 is selected as secondary video content 160 to replace a portion (i.e., replaced primary portion 170) of the primary video content 150. As described above, the activity increase 465 in the second video game 451 may serve as an indication that the second video game 451 may be experiencing intense or key moments that may likely be of high interest to viewer 130. In the example of FIG. 4, a downtime event (i.e., activity decrease 165) in the first video game 191 (i.e., primary video content 150) coincides with a detected spike in activity (i.e., activity increase 465) in the second video game 451. In some examples, this may allow viewers to experience intense or key moments from the second video game 451 during the downtime event in the first video game 191. In some examples, the video streaming service 120 may monitor activity levels in the second video game 451, such as by using any or all of the activity detection techniques described above (e.g., video game state data, image data analysis, service data analysis, etc.). The video streaming service 120 may then detect an indication of a temporary increase in player activity associated with the second video game 451. In some examples, the indication of the increase in player activity may correspond to events such as an increase in player movement, a player joining the second video game 451, a start of a match or battle in the second video game 451, an end of a loading stage in the second video game 451, or other events. It is noted that, while the example of FIG. 4 corresponds to a scenario in which the activity increase 465 in the second video game 451 coincides with an activity decrease 165 in the first video game 191, there is no requirement that the first video game 191 must experience a downtime event or other activity decrease in order to be replaced by video from the second video game 451. For example, in some cases, when an activity spike detected in the second video game 451, the output video stream 106 may switch to the second video game 451 even in scenarios when there is no activity decease in the first video game 191.

Figure 5:
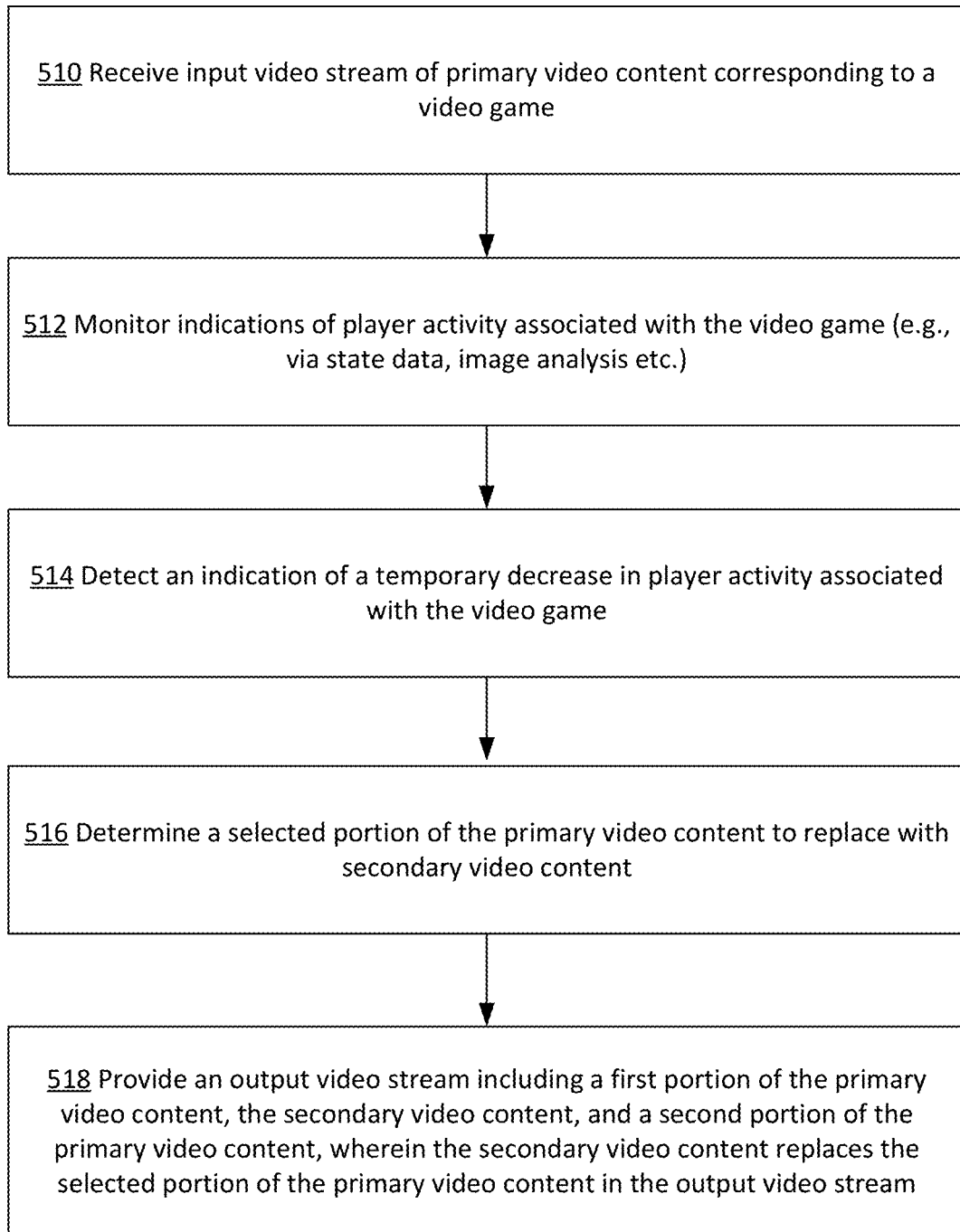
FIG. 5 is a flowchart illustrating an example activity-based streaming video replacement process that may be used in accordance with the present disclosure.

FIG. 5 is a flowchart illustrating an example activity-based streaming video replacement process that may be used in accordance with the present disclosure. As shown, the process of FIG. 5 is initiated at operation 510, at which an input video stream of primary video content corresponding to a video game is received. For example, as shown in FIG. 1, input video stream 105 including primary video content 150 is received by video streaming service 120. As described above, in some examples, the input video stream may be a live video stream that includes live primary video content, such as video of the video game that is transmitted and eventually viewed during playing of the video game with only small amounts of latency between the time that the video content is captured and the time that the video is eventually played to viewers. In some examples, the primary video content included in the input video stream may include game video output from the video game (e.g., rendered graphical output) as well as video from a webcam or other video camera (e.g., video of the streamer's face as the streamer describes and/or discusses gameplay).

At operation 512, indications of player activity associated with the video game are monitored, for example by the video streaming service. For example, as described above, the video streaming service may receive and monitor video game state data (e.g., game metadata) received from the video game that indicate changes in player activity. As also described above, the video game streaming service may also perform an automated software-based image analysis of the primary video content to monitor indications of player activity associated with the video game. This image analysis may be performed on the game video output as well as on webcam or other camera data included in the primary video content.

At operation 514, an indication of a temporary decrease in player activity associated with the video game is detected, such as activity decrease 165 of FIG. 1. As described above, the indication of the temporary decrease in player activity may correspond to events such as a loading stage, a respawn event, an end of a match or battle, a character death, a player leaving the video game, a decrease in player movement, and/or other events. In some examples, the indication of the temporary decrease in player activity may be detected based on monitored video game state data provided by the video game. For example, in some cases, the state data may include descriptions of specific event types, such as a loading stage or a respawn event. In some examples, the state data may be less specific, and may simply indicate that a downtime event or period of low activity is occurring, without identifying a specific type of downtime event. Also, in some examples, the state data may include game statistical information, such as amounts and/or frequencies of player movement over one or more time periods, player scores, standings, inventories, locations, health, timing information, and the like.

Also, in some examples, the indication of the temporary decrease in player activity may be detected by performing an image analysis on the live primary video content to identify a visual cue within the live primary video content. In some cases, the visual cue may include text within the primary video content. For example, one or more frames of the primary video content may include text such as "loading" to indicate a downtime event. In other examples, a text field that shows a number of active players or a list of player names may be analyzed to detect when a player joins or leaves the game or when a character is killed. In yet other examples, a clock or timer that shows time remaining in a match or battle may be detected and read to determine when the match or battle ends. Also, in some examples, the visual cue may include graphics within the primary video content. For example, one or more frames of the primary video content may include graphics indicative of a downtime event, such as a death animation, crossing a finish line, characters running off a field, and the like. In yet other examples, the indication of the downtime event may include a metadata tag or watermark that is inserted into one or more images of the primary video content. In yet other examples, the visual cue may include a game player (e.g., the streamer) exiting from a field of view of a webcam (or other camera) capturing video included in the primary video content. For example, if the streamer leaves a room or otherwise leaves the webcam's field of the view for at least a threshold time period, then this may be indicative of the decrease in player activity. The indication of the temporary decrease in player activity may also be detected based on an analysis of service data, such as a decrease in chat messages related to a particular game.

At operation 516, a selected portion of the primary video content to replace with secondary video content is determined. Operation 516 may be performed by one or more computing devices, such as by a video streaming service that executes on the one or more computing devices. The selected portion of the primary video content to replace with secondary video content may be determined based at least in part on the indication of the temporary decrease in player activity. The selected portion of the primary video content may be between a first portion of the primary video content and a second portion of the primary video content. In some examples, a predicted duration associated with the temporary decrease in player activity may be estimated. In some examples, the predicted duration associated with the temporary decrease in player activity may be estimated based at least in part on a type of in-game event (e.g., loading stage, respawn event, etc.) to which the temporary decrease in player activity corresponds. For example, in some cases, the video streaming service 120 may estimate that a loading stage may last two minutes, while a respawn event may be estimated to last for sixty seconds. Also, in some cases, the predicted duration may differ based on different video game titles or levels. For example, a loading stage for a first game title may be estimated to take two minutes, while a loading stage for a second game title may be estimated to take three minutes. Also, in some examples, a duration of the selected portion of the primary video content to replace with the secondary video content may be selected based at least in part on the predicted duration associated with the temporary decrease in player activity. Moreover, in some examples, a duration of the secondary video content that replaces the selected portion of the primary video content may also be selected based at least in part on the predicted duration associated with the temporary decrease in player activity. For example, in some cases, if it is predicted that the decrease in player activity will last for two minutes, then a secondary content item having a duration of two minutes may be selected to replace the primary content. In other examples, instead of using a single secondary content item that is two minutes long, two secondary content items that are each one minute long may be used (for a total of two minutes).

In some examples, in order to determine when the downtime event is completed, the video streaming service 120 may monitor the primary video content 150 to determine an indication of an increase in player activity. This increase in player activity may serve as a trigger to switch back to the primary content, either immediately or after some delay (e.g., the system may allow a current advertisement finish before switching back to the primary content—but may not show any additional advertisements). Thus, the video streaming service may determine to stop replacement of the primary video content with the secondary video content based at least in part on a detection of an increase in player activity associated with the video game.

At operation 518, an output video stream is provided that includes a first portion of the primary video content, the secondary video content, and a second portion of the primary video content, wherein the secondary video content replaces the selected portion of the primary video content in the output video stream. As also described above, in some examples, the input video stream described above with reference to FIG. 5 may be a first input video stream, and the video streaming service may receive at least one other input video stream including other primary video content corresponding to the same video game as the first input video stream. It is likely that, because they are from the same video game, these input video streams will experience downtime events at the same or similar times. Thus, the video streaming service may coordinate the at least one other input video stream including the other primary video content corresponding to the same video game to have the other primary video content replaced at a same time as the first input video stream.

Figure 6:
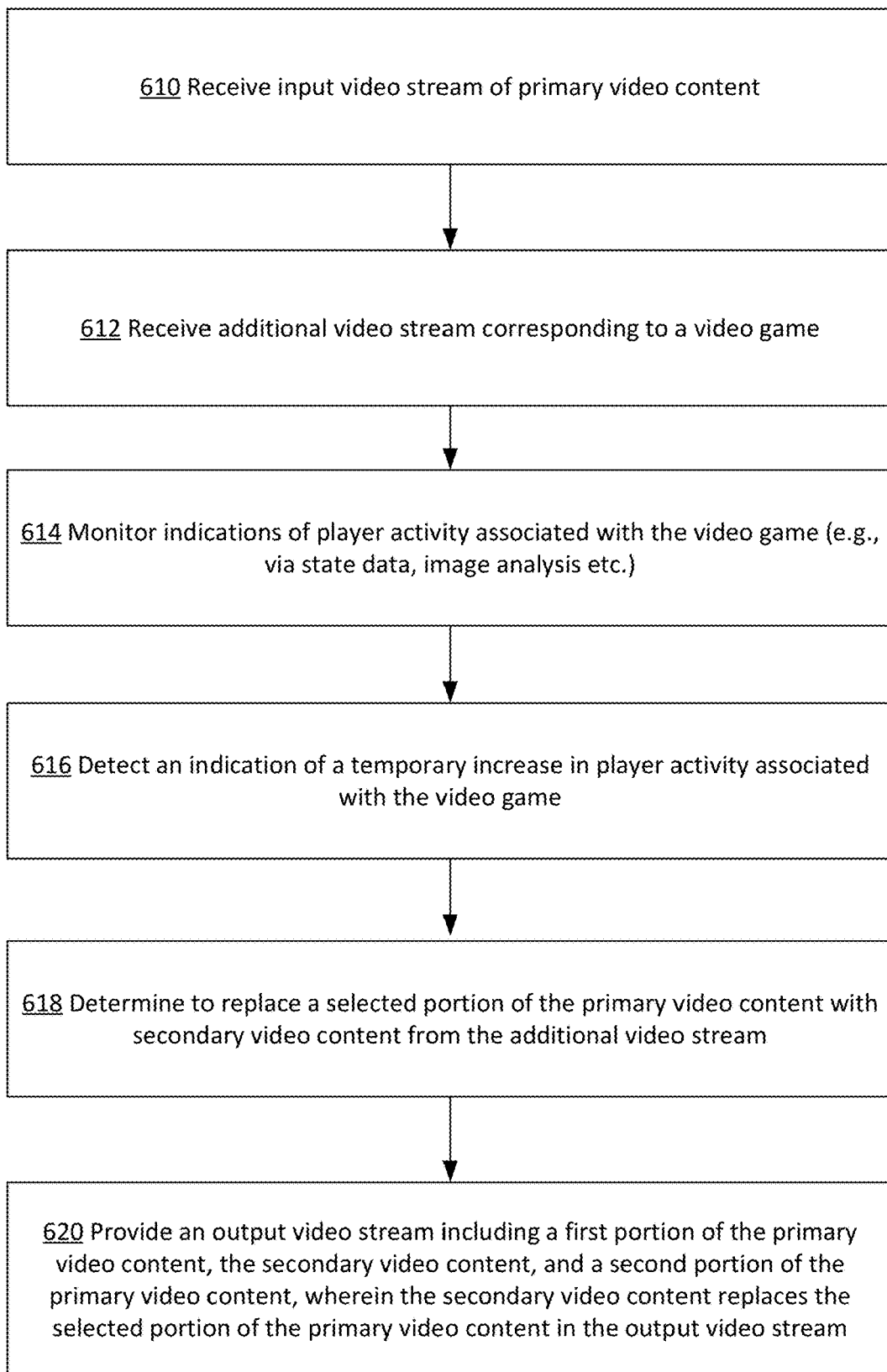
FIG. 6 is a flowchart illustrating an example activity-based replacement video selection process that may be used in accordance with the present disclosure.

FIG. 6 is a flowchart illustrating an example activity-based replacement video selection process that may be used in accordance with the present disclosure. As shown, the process of FIG. 6 is initiated at operation 610, at which an input video stream of primary video content corresponding to a video game is received. For example, as shown in FIG. 4, input video stream 105 including primary video content 150 is received by video streaming service 120. At operation 612, an additional video stream corresponding to a video game is received. For example, as shown in FIG. 4, additional video stream 406 including additional video content 450 from second video game 451 is received by video streaming service 120. In some examples, the additional video stream (as well as the input video stream) may be a live video stream that includes live video content, such as video of a video game that is transmitted and eventually viewed during playing of the video game with only small amounts of latency between the time that the video content is captured and the time that the video is eventually played to viewers. In some examples, the additional video content included in the additional video stream (as well as the primary video content in the input video stream) may include game video output from a video game (e.g., rendered graphical output) as well as video from a webcam or other video camera (e.g., video of the streamer's face as the streamer describes and/or discusses gameplay). For example, the additional video content 450 and the additional video stream 406 of FIG. 4 may include game output (e.g., rendered graphical output) from the second video game 451 as well as webcam video of a streamer that is playing the second video game 451 and commenting on gameplay.

At operation 614, indications of player activity associated with the video game (e.g., the second video game 451) are monitored, for example by the video streaming service. For example, as described above, the video streaming service may receive and monitor video game state data (e.g., game metadata) received from the video game that indicates changes in player activity. As also described above, the video game streaming service may also perform an automated software-based image analysis of the primary video content to monitor indications of player activity associated with the video game. This image analysis may be performed on the game video output as well as on webcam or other camera data included in the primary video content.

At operation 616, an indication of a temporary increase in player activity associated with the video game is detected, such as activity increase 465 of FIG. 4. As described above, the indication of the temporary increase in player activity may correspond to events such as an increase in player movement, a player joining the video game, a start of a match or battle, an end of a loading stage, an end of a respawn event, and/or other events. In some examples, the indication of the temporary increase in player activity may be detected based on the monitored video game state data provided by the video game. For example, in some cases, the state data may include descriptions of specific event types, such a player joining a game or an end of a loading stage. In some examples, the state data may be less specific, and may simply indicate that a period of increased activity is occurring, without identifying a specific type of event. Also, in some examples, the state data may include game statistical information, such as amounts and/or frequencies of player movement over one or more time periods, player scores, standings, inventories, locations, health, timing information, and the like.

Also, in some examples, the indication of the temporary increase in player activity may be detected by performing an image analysis on the additional video stream to identify a visual cue within the additional video stream. In some cases, the visual cue may include text within the additional video stream. For example, a text field that shows a number of active players or a list of player names may be analyzed to detect when a player joins the game. Also, in some examples, the visual cue may include graphics within the additional video stream. For example, one or more frames of the additional video stream may include graphics indicative of an increase in player activity, such as characters running onto a field of play, characters or vehicles leaving a starting area of a race, and the like. In yet other examples, the indication of the increased activity may include a metadata tag or watermark that is inserted into one or more images of the additional video stream. In yet other examples, the visual cue may include a game player (e.g., the streamer) entering into (e.g., for the first time or returning into) to a field of view of a webcam (or other camera) capturing video included in the additional video stream. For example, if the streamer leaves the webcam's field of view—but then subsequently returns to the field of view, then this return may be indicative of the increase in player activity. The indication of the temporary increase in player activity may also be detected based on an analysis of service data related to the additional video stream. For example, to indicate an increase in activity, the service data 126 may indicate an increase in text messages being sent that are related to an application (e.g. video game) that is shown in the additional video stream, an increase in votes or wagers associated with an application that is shown in the additional video stream, and/or an increase in viewers of streams that include an application that is shown in the additional video stream.

At operation 618, a determination is made to replace a selected portion of the primary video content with secondary video content from the additional video stream. For example, as shown in FIG. 4, replaced primary portion 170 is replaced with secondary video content 160 that includes replacement portion 460 from additional video stream 406. Operation 618 may be performed by one or more computing devices, such as by a video streaming service that executes on the one or more computing devices. The determination of operation 618 may be made based at least in part on the indication of the temporary decrease in player activity detected at operation 616. The selected portion of the primary video content may be between a first portion of the primary video content and a second portion of the primary video content.

As described above, in some examples, the increase in player activity in the additional video stream may coincide with a decrease in player activity in the primary video content of the input video stream. This may allow an increased activity event in the additional video stream to replace (i.e. substitute for) a downtime event in the in primary video content. In some examples, the determination of operation 618 may be based on a combination of the increase in player activity in the additional video stream and the decrease in player activity in the primary video content of the input video stream. For example, in some cases, the determination may be triggered when the activity increase and/or the activity decrease exceed one or more selected threshold levels, such as activity increase threshold, an activity decrease threshold, or a combined threshold that measures a combined change in activity for both the primary and secondary content. These thresholds may be based on any appropriate measure or combination of measures, such as related to any or all of the example factors described above (e.g., amounts of change player movement, amounts of change in related chats, amounts of players joining or leaving, etc.). In some examples, the additional video stream may be selected from a plurality of additional video streams to provide the live secondary video content based at least in part on a comparison of player activity levels for the plurality of live additional video streams. For example, if there is a downtime event in the primary video content, then it may be desirable to replace the primary video content with the most exciting or interesting secondary video that is available at the time. Thus, activity levels for a plurality of additional video streams may be compared, such as to select the additional video stream that is currently experiencing a highest level of player activity, and which may therefore be presumed to be the most exciting or interesting to viewers. This highest activity stream may then be selected and used to provide the secondary content that is used to replace the primary content during the downtime event in the primary content. In some examples, although a plurality of additional video streams may be considered (and compared against one another) as potential replacements for the primary video stream, the potential replacement video streams may sometimes be limited such that only additional video streams having one or more common characteristics to the primary video stream are considered as potential replacements. For example, in some cases, it may be desirable to replace video game content with secondary content from another video game of the same genre. As a specific example, it might be desirable to replace primary content from a car racing game with secondary content from other racing games, or to replace primary content from a football game with secondary content from other football or sports games. It may be assumed that viewers of a game may be more interested in video from other games of the same genre (than in video from other games of different genres).

Additionally, as described above, in some examples, a predicted duration of a downtime event in the primary content may be estimated. In some examples, it may be desirable to find an additional video stream that is having a period of increased activity that will match the duration of the downtime event. Thus, in some examples, a predicted duration of the temporary increase in player activity in the additional video stream may be estimated. In some cases, the predicted duration of the temporary increase in player activity may be estimated based at least in part on a type of in-game event to which the temporary increase in player activity corresponds. For example, if the increase in player activity corresponds to a start of a match or battle, a predicted duration of the match or battle may be estimated. The additional video stream may then be selected to provide the secondary video content based at least in part on the predicted duration of the temporary increase in player activity. For example, if the downtime event in the primary video content is expected to last for approximately two minutes, then it may be advantageous to replace the primary video content with an additional video stream that is experiencing an increase in player activity that is also expected to last for approximately two minutes. Furthermore, in some examples, after it has started to replace the primary video content with the secondary video content, the video streaming service may detect a decrease in player activity associated with the video game to which the additional video stream corresponds. The video streaming service may then determine to stop replacement of the primary video content with the secondary video content based at least in part on the detection of the decrease in player activity.

At operation 620, an output video stream is provided that includes a first portion of the primary video content, the secondary video content, and a second portion of the primary video content, wherein the secondary video content replaces the selected portion of the primary video content in the output video stream. For example, as shown in FIG. 4, output video stream 106 includes first primary portion 151, secondary video content 160, and second primary portion 152. The secondary video content 160 (which includes replacement portion 460 from additional video stream 406) replaces the replaced primary portion 170.

Figure 7:
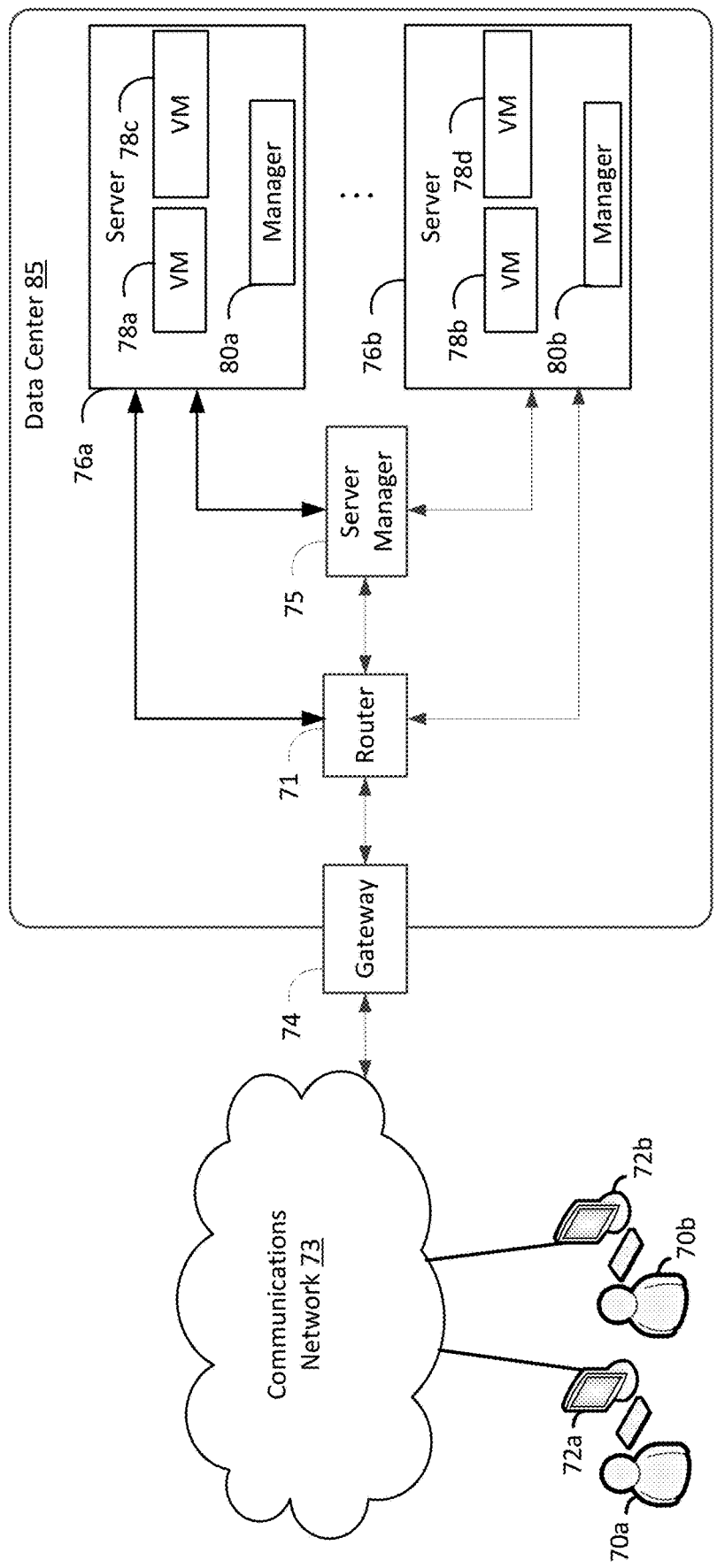
FIG. 7 is a diagram illustrating an example system for transmitting and providing data that may be used in accordance with the present disclosure.

The example processes of FIGS. 6 and 7 relate to detection of indications of temporary increases and/or decreases in player activity associated with a video game. It is noted, however, that the techniques described herein are not limited to video games and may also be employed to detect temporary increases and/or decreases in user activity associated with computing applications other than video games, such as browsing applications, collaboration applications, productivity applications, and others. In some examples, video may be captured and streamed from those other computing applications, and the video may be monitored for visual cues indicating increases and/or decreases in activity of users of those applications. Moreover, state data identifying actions and/or events occurring within those applications may also be received and monitored, for example by a video streaming service, for indications of increases and/or decreases in activity of users of those applications.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76*a* and 76*b*. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
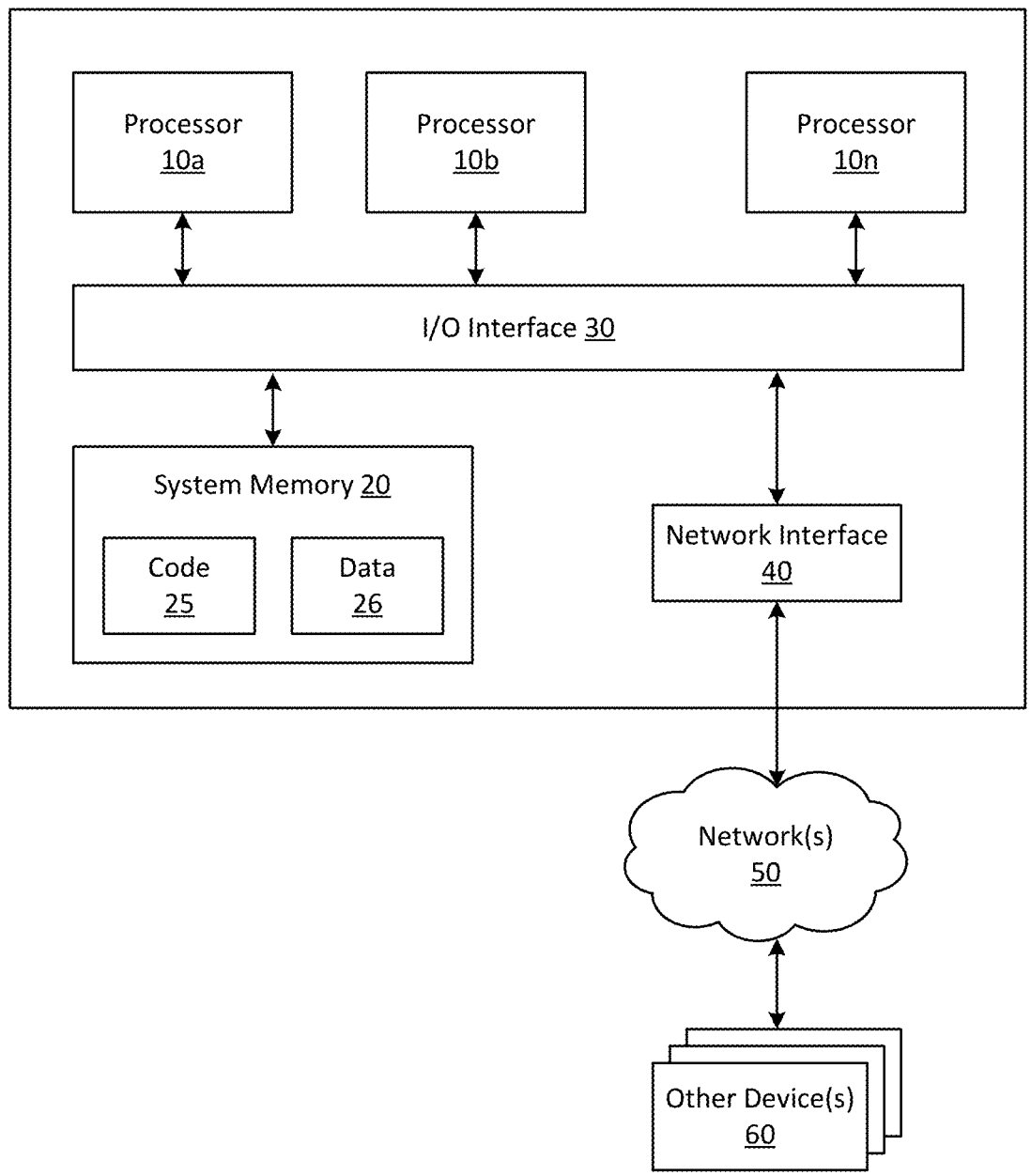
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving a first input video stream of live primary video content corresponding to a video game;
detecting an indication of a temporary decrease in player activity associated with the video game, wherein the indication of the temporary decrease in player activity is detected by performing an image analysis on the live primary video content to identify a visual cue within the live primary video content, wherein the visual cue comprises a game player exiting from a field of view of a webcam capturing video included in the live primary video content;
determining, by one or more computing devices, based at least in part on the indication of the temporary decrease in player activity, a selected portion of the live primary video content to replace with secondary video content, wherein the selected portion of the live primary video content is between a first portion of the live primary video content and a second portion of the live primary video content; and
providing an output video stream including the first portion of the live primary video content, the secondary video content, and the second portion of the live primary video content, wherein the secondary video content replaces the selected portion of the live primary video content in the output video stream.

2. The computing system of claim 1, wherein the indication of the temporary decrease in player activity corresponds to at least one of a loading stage, a respawn event, an end of a match or battle, a character death, a player leaving the video game, or a decrease in player movement.

3. A computer-implemented method comprising:
receiving a first input video stream of primary video content corresponding to an application;
detecting an indication of a temporary decrease in user activity associated with the application, wherein the indication of the temporary decrease in user activity is detected by performing an image analysis on the primary video content to identify a visual cue within the primary video content, wherein the visual cue comprises a game player exiting from a field of view of a webcam capturing video included in the primary video content;
determining, by one or more computing devices, based at least in part on the indication of the temporary decrease in user activity, a selected portion of the primary video content to replace with secondary video content, wherein the selected portion of the primary video content is between a first portion of the primary video content and a second portion of the primary video content; and
providing an output video stream including the first portion of the primary video content, the secondary video content, and the second portion of the primary video content, wherein the secondary video content replaces the selected portion of the primary video content in the output video stream.

4. The computer-implemented method of claim 3, wherein the indication of the temporary decrease in user activity corresponds to at least one of a loading stage, a respawn event, an end of a match or battle, a character death, a player leaving a video game, or a decrease in player movement.

5. The computer-implemented method of claim 3, wherein the visual cue further comprises text or graphics included in the primary video content.

6. The computer-implemented method of claim 3, further comprising coordinating at least one other input video stream including other primary video content corresponding to the application to have the other primary video content replaced at a same time as the first input video stream.

7. The computer-implemented method of claim 3, further comprising estimating a predicted duration associated with the temporary decrease in user activity based at least in part on a type of event to which the temporary decrease in user activity corresponds.

8. The computer-implemented method of claim 7, further comprising selecting, based at least in part on the predicted duration associated with the temporary decrease in user activity, a duration of the secondary video content that replaces the selected portion of the primary video content.

9. The computer-implemented method of claim 3, further comprising determining to stop replacement of the primary video content with the secondary video content based at least in part on a detection of an increase in user activity associated with the application.

10. One or more non-transitory computer-readable storage media having stored thereon computing instructions that, upon execution by one or more computing devices, cause the one or more computing devices to perform operations comprising:
  receiving a first input video stream of primary video content corresponding to an application;
  detecting an indication of a temporary decrease in user activity associated with the application, wherein the indication of the temporary decrease in user activity is detected by performing an image analysis on the primary video content to identify a visual cue within the primary video content, wherein the visual cue comprises a game player exiting from a field of view of a webcam capturing video included in the primary video content;
  determining, by one or more computing devices, based at least in part on the indication of the temporary decrease in user activity, a selected portion of the primary video content to replace with secondary video content, wherein the selected portion of the primary video content is between a first portion of the primary video content and a second portion of the primary video content; and
  providing an output video stream including the first portion of the primary video content, the secondary video content, and the second portion of the primary video content, wherein the secondary video content replaces the selected portion of the primary video content in the output video stream.

11. The one or more non-transitory computer-readable storage media of claim 10, wherein the indication of the temporary decrease in user activity corresponds to at least one of a loading stage, a respawn event, an end of a match or battle, a character death, a player leaving a video game, or a decrease in player movement.

12. The one or more non-transitory computer-readable storage media of claim 10, wherein the selected portion of the primary video content comprises one or more complete frames of the primary video content.

13. The one or more non-transitory computer-readable storage media of claim 10, wherein the selected portion of the primary video content comprises one or more portions of one or more frames of the primary video content.

14. The computing system of claim 1, wherein the visual cue further comprises text or graphics included in the live primary video content.

15. The one or more non-transitory computer-readable storage media of claim 10, wherein the visual cue further comprises text or graphics within the primary video content.

* * * * *